Figures 1, 2:
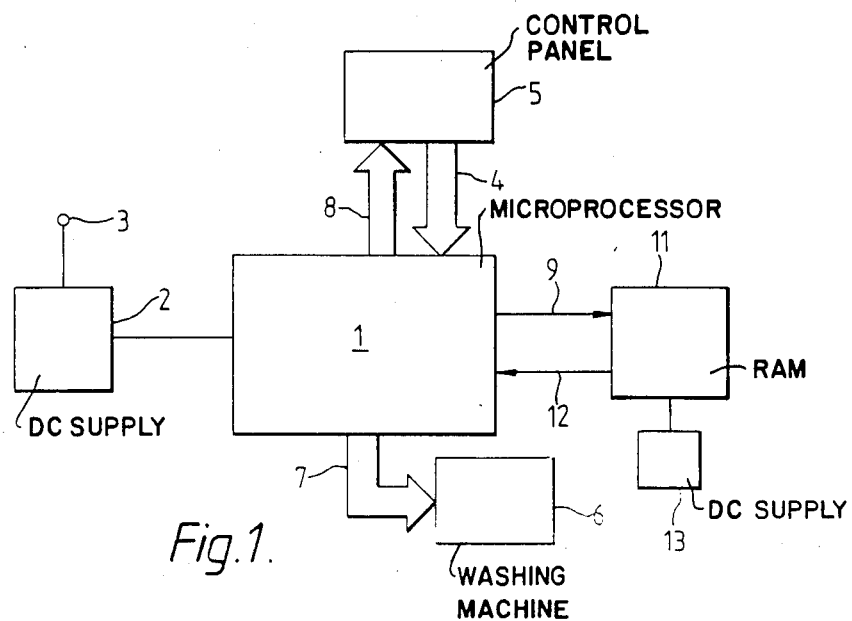

United States Patent [19]

Easthill

[11] Patent Number: 4,631,658
[45] Date of Patent: Dec. 23, 1986

[54] METHOD OF AND APPARATUS FOR CONTROLLING A DOMESTIC APPLIANCE

[75] Inventor: Stephen P. Easthill, Chessington, England

[73] Assignee: U.S. Philips Corporation, New York, N.Y.

[21] Appl. No.: 637,662

[22] Filed: Aug. 3, 1984

[30] Foreign Application Priority Data

Aug. 17, 1983 [GB] United Kingdom ............... 8322169

[51] Int. Cl.⁴ ..................... G06F 15/46; G06F 11/00
[52] U.S. Cl. ................................. 364/184; 364/186; 364/400; 371/13; 371/16; 371/66
[58] Field of Search .................. 364/184–187, 364/130, 400; 371/10, 12, 13, 14, 21, 61, 62, 66, 16; 365/226, 228, 229

[56] References Cited

U.S. PATENT DOCUMENTS

| | | | |
|---|---|---|---|
| 3,286,239 | 11/1966 | Thompson et al. | 371/66 X |
| 3,321,747 | 5/1967 | Adamson | 371/66 X |
| 3,959,778 | 5/1976 | Brette | 364/200 |
| 4,232,377 | 11/1980 | Tallman | 365/229 |
| 4,393,500 | 7/1983 | Imazeki et al. | 371/66 X |
| 4,412,284 | 10/1983 | Kerforne et al. | 371/66 |
| 4,455,652 | 6/1984 | Van Der Mevlen | 371/16 |
| 4,521,847 | 6/1985 | Ziehm et al. | 371/12 X |

FOREIGN PATENT DOCUMENTS 0031498 7/1981 European Pat. Off. .
2013378A 8/1979 United Kingdom .

*Primary Examiner*—Joseph Ruggiero
*Attorney, Agent, or Firm*—Robert T. Mayer; Bernard Franzblau

[57] ABSTRACT

In a domestic appliance, such as a washing machine, which is controlled by a solid state processor 1, failure of the mains supply causes the loss of program-identifying data held in the processor store. A back-up non-volatile store 11 keeps track of the program status and enables the program to be continued from where it left off in the event of an interruption of the power supply. The arrangement is such that possible corruption of the store contents by a hostile environment is minimal.

8 Claims, 4 Drawing Figures

METHOD OF AND APPARATUS FOR CONTROLLING A DOMESTIC APPLIANCE

This invention relates to a method of controlling a domestic appliance, powered from an electric mains supply, by means of a solid state processor which controls the operation of the appliance by selecting an optionally variable number of operating steps from N such steps held in the processor in accordance with any one of a number of programmes selectable by the user.

The invention also relates to a domestic electrical appliance, such as a washing machine, having means for performing the method.

A problem that can arise in an appliance which is controlled by a solid state processor, e.g. a microprocessor, to perform a sequence of routines is that any failure of the power supply to the processor during a programme results in the destruction of the data in the processor identifying the programme in progress. This means that when the power supply is restored, the programme has to be restarted from the beginning and that some of the programme steps are repeated unnecessarily. It is known from U.K. Patent Specification No. 1,529,691 to provide the apparatus with a power failure detector and a data-salvaging store to which all the data necessary for the subsequent continuation of the programme are rapidly transferred and in which they are stored if, and only if, a power failure is detected. If the power supply is re-established within a short period, e.g. a few seconds, the programme continues from the point at which it was interrupted. The data-salvaging store may be a permanent (non-volatile) store or may be powered by a capacitor which, in operation of the apparatus, is charged by a current derived from the mains power supply. This means that the power has to be restored within the discharge time constant of the capacitor in order to enable all of the data in the temporary salvage store to be read back and stored by the processor. The object of that arrangement is to make allowance for a momentary failure of the power supply, particularly during unattended operation, such that the programme can continue after a brief interruption from where it left off, even though the programme details and status have been lost from the processor. If the power is not restored during this short period, the programme is started from the beginning when the power is subsequently restored.

Solid state processors such as microprocessors can, however, be affected in severe environments in that the data stored therein can be corrupted by various forms of interference such as voltage spikes, static, and the switching of inductive loads such as motors, solenoids, and electromagnetic relays. Such corruption, e.g. to the programme counter, can result in incorrect programme operation. Thus any power supply interference which results in immediate salvaging of the data may also have corrupted that data before, or during, the salvage operation. The interference can be particularly severe if power is being supplied to inductive devices at the instant the power is disconnected. In this case corruption or degradation of the data can be caused by the original interference and additionally by the consequent, and subsequent, large voltage spikes caused by breaking inductive circuits.

The corruption may be such that the processor is still able to run although the data stored in its random access memory (RAM), programme counter, etc., is corrupt. This will result in an incorrect programme being run by the processor, with possibly disastrous results. An object of the invention is at least to reduce the possibility of corruption and, hence, its adverse effects. Another object of the invention is to eliminate the need to provide a mains failure detector.

According to the invention, there is provided a method of controlling a domestic appliance, powered from an electric mains supply, by means of a solid state processor which controls the appliance by selecting an optionally variable number of operating steps from N such steps in accordance with any one of a number of programmes selectable by the user. The method includes, before any operating step is effected by the processor, running a start-up routine comprising:

(i) checking a test code pre-loaded in a non-volatile memory for corruption and, if no corruption of the code is found, (ii) reading each of N addresses in the said memory in sequence to determine whether data stored at each address has a respective first predetermined value and either (a) if none of the N addresses contains data which has the first predetermined value, then loading each of the N addresses with data having the first predetermined value or (b) if an address in the sequence is reached which contains the first predetermined value, then causing the processor to read that address whereby the processor, when effecting the operating steps, starts at the operating step corresponding to that address:

The method further includes, on completion of the start-up routine, effecting the operating steps and, as each of the N steps is processed, loading the corresponding address in the memory with data having a second value different from the said first predetermined value.

According to a further aspect of the invention, there is provided a domestic appliance, operable from an electric mains supply, having control means including a solid state processor which controls the appliance by selecting an optionally variable number of operating steps from N such steps, stored in the processor, in accordance with any one of a number of programmes selectable by the user, the control means further including a non-volatile memory containing a corruption test code, information identifying a selected programme, and respective data at each of N addresses which defines whether or not the particular step corresponding to that address was reached during the running of the last previous programme, start-up means solely operative before the processor effects any operating step to check the test code for corruption and to examine the data at each of the N addresses in the memory in sequence, the processor having means for reading the memory and starting the operation of the appliance either from the first selected one of the N operating steps or, if the data at any of the N addresses in the memory indicates that a particular operating step was not reached during the last previous run, starting the operation of the appliance from the first operating step in the sequence that was not so reached.

Thus in a method in accordance with the invention N addresses in the non-volatile store, corresponding to the possible N operating steps in the processor, are searched to check their contents for information as to whether or not the last previous programme was completed. If it was completed, e.g. the mains interruption was caused by switching off the appliance in the normal way, then the new programme data is written into the memory.

If the last previous programme was not completed, then data relating to that programme is still held in the memory together with information concerning the first operating step in the sequence that was not performed in that last previous programme. In this manner the programme can be started from the point at which the previous programme failed.

Of particular significance is the fact that no data has to be transferred from the processor to the non-volatile memory at the instant a power failure occurs. This not only eliminates the need for a power failure detector but also eliminates the need for expensive data acquisition and transfer equipment. The possibility of data corruption at the instant of power failure is greatly reduced since no data is transferred to the non-volatile store at that instant.

It is possible, but unlikely, that the data stored in the non-volatile memory may be corrupted. In order to check for this, a pre-loaded test code in the memory is tested for corruption. On the basis that any corruption of data in the memory would be evidenced by corruption of the test code, the programme is allowed to run if no such corruption is found. If, on the other hand, corruption of the test code is found, a test and fault routine may be implemented.

It is also to be noted that these checks are made before the operating steps are performed, i.e. before switching on interference-causing equipment such as motors and valves. Further, if the last previous programme was completed satisfactorily, then the new programme reference data is also written into the memory before performing the operating steps. This means that the possibility of any environmental corruption of the data in the memory is very substantially reduced by virtue of this feature. If the memory has its own unique power supply, such as a storage battery, then even this small possibility of corruption is substantially eliminated.

Figure 3:
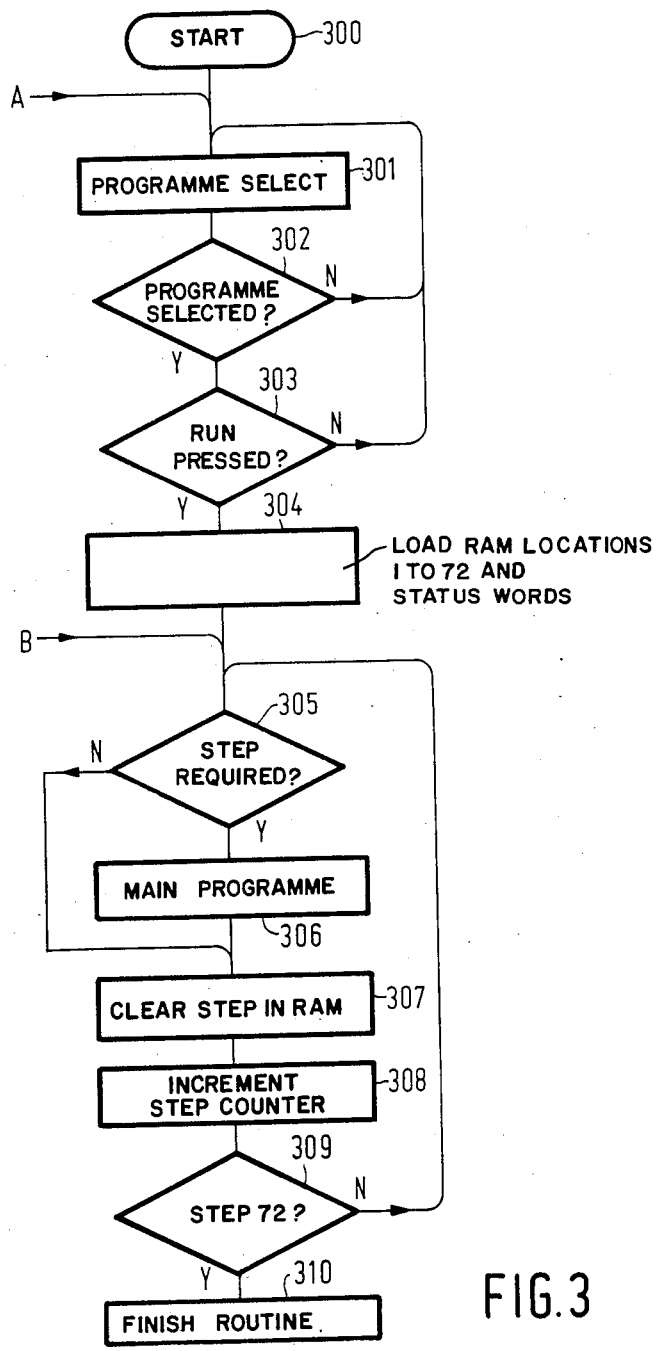
Figure 4:
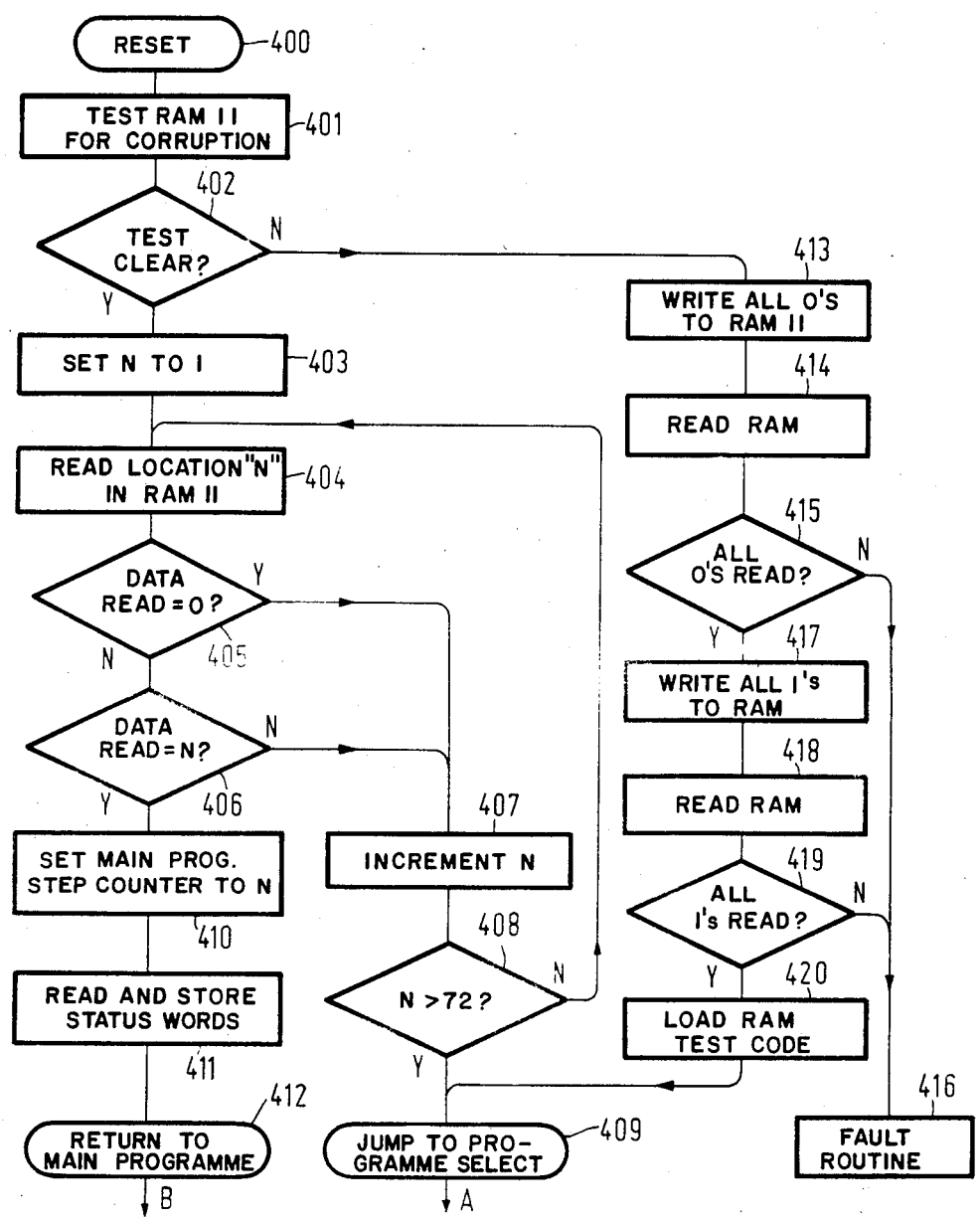

An embodiment of the invention will now be described with reference to the accompanying drawings, in which:

FIG. 1 is a block schematic circuit diagram of control apparatus including a processor, FIG. 2 is a memory map of the non-volatile memory 11 shown in FIG. 1, FIG. 3 is a flow diagram showing the main programme procedure, and FIG. 4 is a flow diagram showing the start-up routine.

In FIG. 1 a microprocessor 1 is powered from a D.C. supply 2 fed from an A.C. mains supply 3. Input commands to the microprocessor are fed via a bus 4 from a control panel 5. The control output of the microprocessor 1 is fed to the apparatus 6 to be controlled via a bus 7.

The apparatus may, for example, be a washing machine in which the control panel 5 comprises a number of push-buttons by means of which the user selects a particular one of several alternative main programmnes and also decides upon options within the selected main programme, such as pre-wash, cold wash, and spin delay. The control panel may also accommodate visual indicators which, for example, may indicate the selected programme, the appropriate options for the selected programme, the progress of the programme, and fault conditions. For these functions, information may be fed from the microprocessor via a bus 8. The controlled apparatus 6 may comprise one or more motors, solenoids, electromagnetic relays, and/or valves. Examples of the control panel 5 and washing machine 6 can be found in the above-mentioned U.K. Pat. No. 1529691. The particular arrangements of the control panel and the apparatus are not relevant to the invention, however, and will not be detailed further.

Microprocessor 1 has a write output 9 to a non-volatile memory, such as a random access memory (RAM), 11 and a read input 12 from RAM 11. RAM 11 is provided with a D.C. supply 13, comprising for example a small rechargeable battery trickle-charged from the A.C. mains supply.

The operation of the circuit shown in FIG. 1 will now be explained with reference to FIGS. 2, 3 and 4.

In FIGS. 3 and 4 the various boxes have the following significances.

FIG. 3.

300—Start
301—Programme select.
302—Programme selected?
303—Run pressed?
304—Load RAM locations 1 to 72 and status words.
305—Step required?
306—Main programme.
307—Clear step in RAM.
308—Increment step counter.
309—Step 72?
310—Finish routine.

FIG. 4.

400—Reset.
401—Test RAM 11 for corruption.
402—Test clear?
403—Set N to 1.
404—Read location "N" in RAM 11.
405—Data read=0?
406—Data read=N?
407—Increment N.
408—N greater than 72?
409—Jump to programme select.
410—Set main programme step counter to N.
411—Read and store status words.
412—Return to main programme.
413—Write all "0"s to RAM 11.
414—Read RAM.
415—All "0"s read?
416—Fault routine.
417—Write all "1"s to RAM.
418—Read RAM.
419—All "1"s read?
420—Load RAM test code.

It is first assumed that any of the selectable programmes and options may be run by the microprocessor by selection from N=72 basic step routines held in a read-only memory (ROM) portion, not shown, of the processor. Thus the main programme facilities are written into a total of 72 operating steps. As each step is completed, a step counter is incremented by 1 and, by referring to a look-up table, a check is made to see if the next sequential step is required for that particular selected programme and options. If not, the step counter is further incremented and the check is again made. The programme is terminated after step 72. RAM 11 has 72 corresponding locations 1 to 72 (FIG. 2). It has two further locations 80, 81 for programme status words and a further 32 locations 96 to 127 which are designated as a RAM test area. The status words identify the particular programme and options selected by the user on control panel 5. The addresses 96 to 127 are loaded with a test code, for example alternate 0's and 1's. This test code is loaded during the first start-up routine, which will be described below.

Referring now to FIG. 3, the user switches on the machine and selects the programme and options. On start-up, the routine checks that a programme has been selected and then waits for the user to operate the "RUN" button to start the programme running. When this is done, RAM locations 1 to 72 are each loaded with their respective location (address) numbers and locations 80 and 81 are loaded with the programme status words. Thus RAM 11 is loaded with the relevant data before any operating step is performed in the main programme.

The processor then checks against the look-up table (e.g. an internal read-only memory) to see if the first operating step is required in the main programme. If "yes", then this step is carried out in the main programme and the first RAM location (1) is cleared to 0. If "no" then location 1 is cleared without step 1 being included in the main programme. The counter is then incremented and the process repeated one step at a time until all 72 steps have been processed, whereupon the routine is terminated.

At the end of the whole routine, all of the 72 step locations in RAM 11 will have been cleared to zero unless there has been a mains supply interruption or other interference.

On initial power-up, the start-up routine shown in FIG. 4 is run. RAM 11 is first tested for possible data corruption by checking the test code stored in locations 96–127. The check may be effected by a simple correlation method or by a sequence test which checks the code for alternate 0's and 1's. Obviously, other test codes could equally well be used, such as the all-1's code in which the correlator is merely an AND gate. It is preferred, however, to have both 0's and 1's in the code. If the test reveals corruption of the test code, then a further test is carried out which loads up the test code locations with one or more check codes and then reads the check codes to see if they are correctly loaded. For example the all-0's code may be written into the test area locations and the stored code then read from the RAM. If the correct all-0's code is read, then the all-1's code may be stored and, if this is also read satisfactorily, then it is assumed that there is no permanent fault on the RAM and, after loading the test code into the RAM, the start-up routine then jumps (point A) to the programme select stage shown in FIG. 3. Thus if a corrupted test code is found in the RAM, the main programme is started from the beginning irrespective of whether or not there has been a mains failure. The reason for this is that if the RAM test code has been corrupted then it is very likely that data in the process has also been corrupted. It is therefore safer to start the new programme from the beginning rather than from a possibly corrupted, and hence arbitrary, starting point. Alternatively, of course, a "yes" response to the "all-1's read" stage could return the start-up routine to the "set N to 1" stage.

If the all-0's and all-1's codes are not read satisfactorily, it is assumed that the RAM has an inherent fault and a fault routine comes into operation. This routine would generally cause an audible and/or visible alarm to be given and prevent further operation of the apparatus.

It will be appreciated from the above that the test code is automatically loaded into RAM 11 when power is first applied to the appliance.

It should be noted that the RAM is tested and loaded before any of the main programme steps is implemented. As explained above, the reason for this is that the stored data is then less likely to be corrupted by, for example, the switching on or off of an electromagnetic relay, pump, or motor.

If the RAM corruption test is clear, the data stored at each of the 72 locations of RAM 11 is next tested in sequence by means of a local N-counter which is first set to location 1.

If the previous programme has run satisfactorily, the data stored at every location 1 to 72 will be zero since each location is cleared to zero in sequence during the running of the main programme. If, however, there has been a mains failure or switch-off during any step in the running of the previous programme, then the preceding RAM locations would contain zeros and the subsequent locations would still contain their respective addresses. This situation is shown in FIG. 2, in which steps 1 to 4 are assumed to have been completed satisfactorily in the previous programme. The data in each of the locations 5 to 72 still corresponds to the respective address, however, and this indicates that these steps were subsequent to the mains failure and were not included in the previous programme. The data at location 4 has been corrupted for some reason or other but, since such corruption can substantially only occur while this location is being addressed (i.e. cleared to zero), it is assumed that the corresponding programme step has been satisfactorily completed.

Returning now to FIG. 4, with the N-counter set to N=1, location 1 is read. The zero at this location (FIG. 2) indicates that this step was performed in the previous programme. The counter is therefore incremented to N=2 and, since N is less than 72, location 2 is read. The process is repeated until step N=4 is reached. The data (13) at this location is neither N (i.e. 4) nor zero and is therefore false. This could have been caused, for example, by a failure or disturbance during the clearing of the location to zero when step 4 was performed during the previous programme. Since the data read is neither zero nor N, it is ignored and the N-counter is incremented to the step N=5.

The data at location 5 is still at N=5 and has not been cleared to zero during the previous programme. Therefore step 5 is the first step that had not been performed in the previous run. The main programme step counter in the processor is now set to 5, the status words are then read and stored in the RAM, and the routine is transferred (point B) to the main programme (FIG. 3) which then determines if this step is required. In this manner the earlier programme, during which a mains failure occurred, is now completed automatically without needing the attention of the user.

Summarising the operation, the non-volatile memory contains a map of the requested programme information to run and each stage is cleared on completion. During the initial power-up stage, the memory is first read for a previous power supply interruption and, if there has been an interruption, the programme is re-established to continue from where it was discontinued by the interruption.

In order to maintain the information stored in RAM 11 when the supply is interrupted, it is provided with its own D.C. power supply 13. The supply 13 may, for example, comprise a rechargeable battery which is trickle-charged, for example, from supply terminal 2. The current taken by the memory 11 is very small and the battery can have a relatively low storage capacity. In a particular embodiment, the microprocessor 1 was a Philips Type MAB 8400B and RAM 11 was a Philips Type PCD 8571.

Although in the embodiment described the step locations are each pre-loaded with their own addresses and then cleared to zero as each step is implemented, this is a matter of convenience and alternative data can of course be used. All that is necessary is that the data at each RAM location be changed from one value to a predetermined different value as each step is satisfactorily implemented.

If the user wishes to change a programme during operation and switches off the machine to cancel the existing programme, then on switching on the machine the programme will automatically start from the step at which the previous programme was terminated. This is entirely satisfactory in the most common case where the user wishes to alter a subsequent step in the programme being run, for example to change the spin-drying time. On the other hand, it is possible that the user may select a programme and, having started the programme, decide that a different programme is required—for example to add a pre-wash stage. To provide for this facility, a user-operator escape routine may be included in which the contents of the RAM 11, apart from the test locations, are cleared. This may be achieved, for example, by the provision of a programme CANCEL button which, when operated by the user, clears the RAM. In order to avoid the need for providing a CANCEL button in addition to the RUN button, the latter can conveniently be used for both purposes. Thus, for example, the processor or other timer may be used to detect whether the RUN button is operated for a period of less than or greater than 5 seconds, for example. If the button is held operated for more than 5 seconds then the RAM clearing routine is initiated.

I claim:

1. A method of controlling a domestic appliance, powered from an electric mains supply, by means of a solid state processor which controls the appliance by selecting an optionally variable number of operating steps from N such steps in accordance with any one of a number of programs selectable by the user, said method comprising, before any operating step is effected by the processor, running a start-up routine comprising:
    (i) checking a test code pre-loaded into a non-volatile memory for corruption and, if no corruption of the code is found,
    (ii) reading each of N addresses in the said memory in sequence to determine whether data stored at each address has a respective first predetermined value and
    (a) if none of the N addresses contains data which has the first predetermined value, then loading each of the N addresses with data having the respective first predetermined value
    or
    (b) if an address in the sequence is reached which contains the first predetermined value, then causing the processor to read that address whereby the processor, when effecting the operating steps, starts at the operating step corresponding to that address;

the method further including, on completion of the start-up routine, effecting the operating steps and, as each of the N steps is processed, loading the corresponding address in the memory with data having a second value different from the first predetermined value.

2. A method as claimed in claim 1, wherein the first predetermined value for each of the N addresses in the memory is its respective address and the second value for each of the N addresses is zero.

3. A method as claimed in claim 1 wherein, if corruption of the test code is found, the operation of the memory is tested by writing a check code into the memory, reading out the check code, and, if the correct code is not read out, initiating a failure routine in which further operation of the appliance is prevented.

4. A method as claimed in claim 3 including, if the correct check code is read, writing the test code into the memory and allowing the programme to continue normally without initiating the failure routine.

5. A domestic appliance, operable from an electric mains supply, comprising control means including a solid state processor which controls the appliance by selecting an optionally variable number of operating steps from N such steps, held in the processor, in accordance with any one of a number of programmes selectable by the user, the control means further including a non-volatile memory containing a corruption test code, information identifying a selected programme, and respective data at each of N addresses which defines whether or not a particular step corresponding to that address was processed during the running of the last previous programme, start-up means solely operative before the processor effects any operating step to check the test code for corruption and to examine the data at each of the N addresses in the memory in sequence, the processor having means for reading the memory and starting the operation of the appliance either from the first selected one of the N operating steps or, if the data at any of the N addresses in the memory indicates that a particular operating step was not crossed during the last previous run, starting the operation of the appliance from the first operating step in the sequence that was not so processed.

6. A domestic appliance as claimed in claim 5 wherein the non-volatile memory comprises a random access memory (RAM) having its own power supply.

7. A domestic appliance as claimed in claim 6 wherein the RAM power supply comprises a re-chargeable battery which, in operation of the appliance, is maintained in the charged state via a trickle-charger which derives a charging current from the mains supply for the appliance.

8. A method as claimed in claim 2 wherein, if corruption of the test code is found, the operation of the memory is tested by writing a check code into the memory, reading out the check code, and, if the correct code is not read out, initiating a failure routine in which further operation of the appliance is prevented.

* * * * *